Sept. 8, 1964 F. J. FIELITZ 3,147,891
DISPENSING DEVICE
Filed June 23, 1961 4 Sheets-Sheet 1

INVENTOR.
FREDERICK J. FIELITZ
BY
his ATTORNEYS

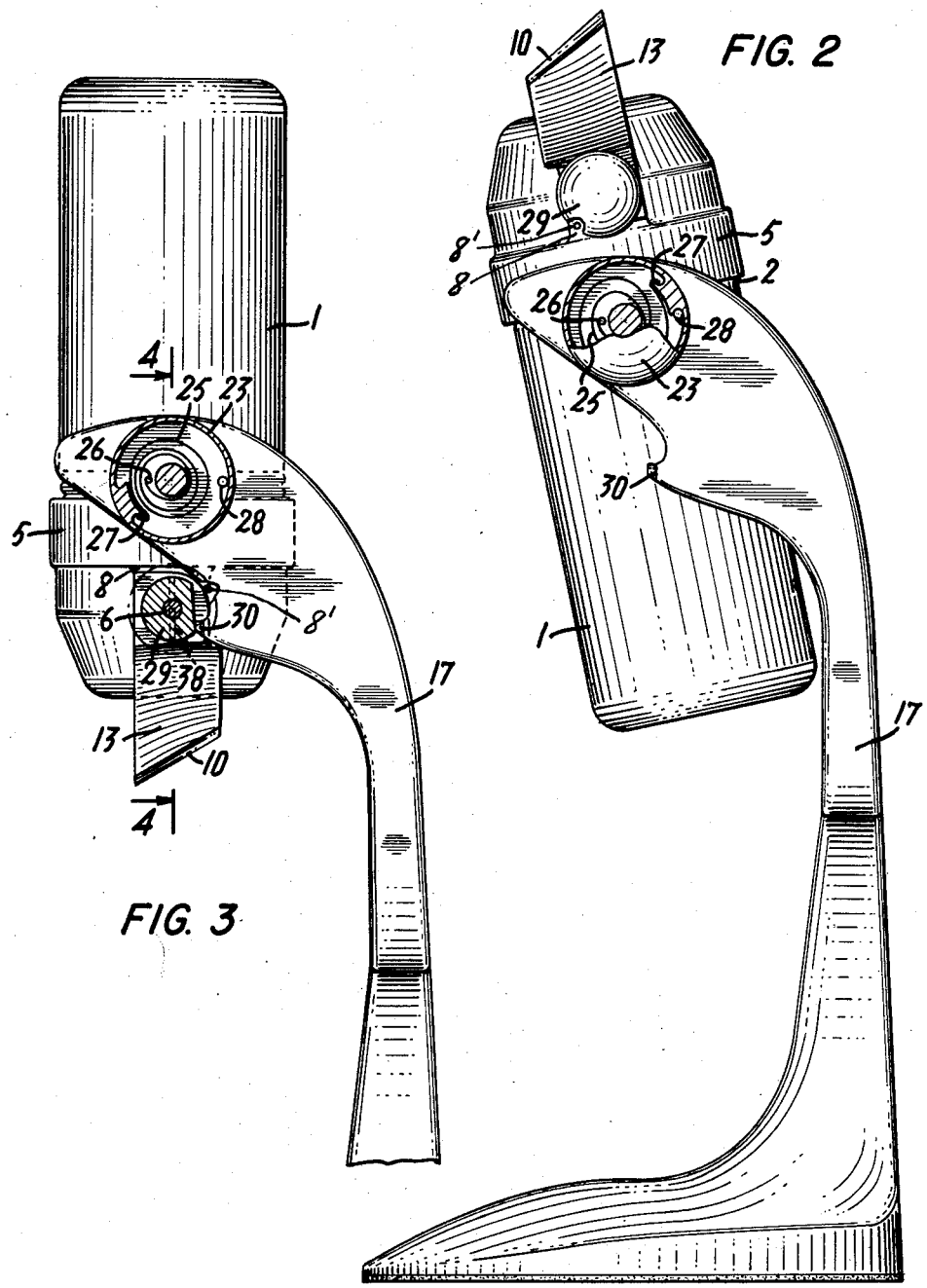

Sept. 8, 1964     F. J. FIELITZ     3,147,891
DISPENSING DEVICE
Filed June 23, 1961     4 Sheets-Sheet 3
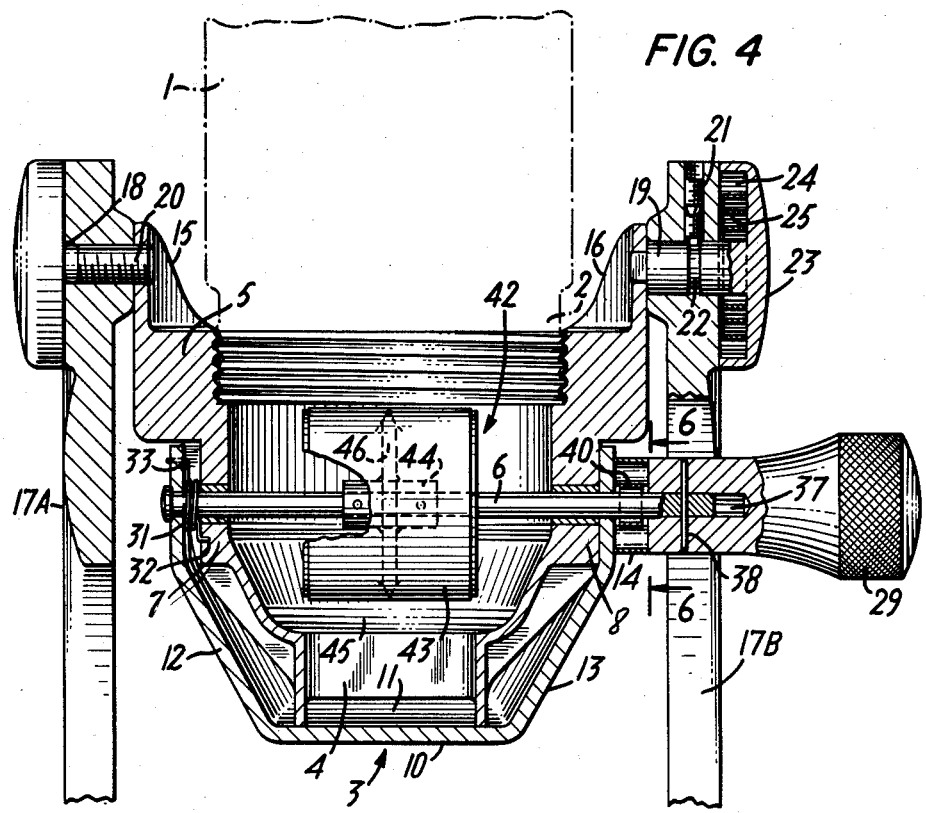
FIG. 4
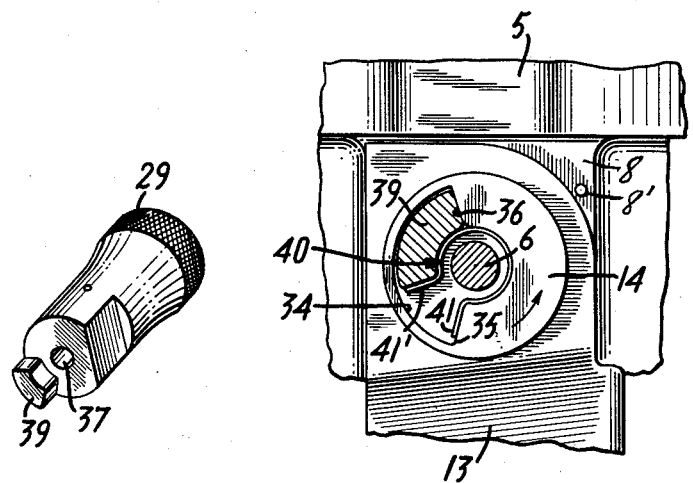
FIG. 5
FIG. 6
INVENTOR.
FREDERICK J. FIELITZ
BY
Brumbaugh, Free, Graves & Donohue
his ATTORNEYS Sept. 8, 1964  F. J. FIELITZ  3,147,891
DISPENSING DEVICE Filed June 23, 1961  4 Sheets-Sheet 4

INVENTOR.
FREDERICK J. FIELITZ
BY
Brumbaugh, Free, Graves & Donohue
his ATTORNEYS United States Patent Office 3,147,891
Patented Sept. 8, 1964

3,147,891
DISPENSING DEVICE
Frederick J. Fielitz, North Arlington, N.J., assignor, by mesne assignments, to Thomas J. Lipton Incorporated, Hoboken, N.J., a corporation of Delaware
Filed June 23, 1961, Ser. No. 119,179
2 Claims. (Cl. 222—166)

This invention relates to a dispensing device and more particularly to an attachment for a container having means for delivering a predetermined amount of material at each cycle of operation.

In the prior art, different types of dispensing devices have been used for dispensing various kinds of foods and material. Difficulty is sometimes encountered in attempting to dispense certain types of material which inherently contain properties which affect the operability of the dispensing device. While this dispensing device may be used for dispensing any kind of food or substance, this device is further adapted for dispensing substances which are light, fluffy and hygroscopic in nature and have a variable bulk density. With such substances, precautions have to be taken to prevent bridging and compacting and also to avoid the adherence of the packed mass of material to the surface of the device. Substances that contain such properties, seriously affect the operability of the device as well as the accuracy of the dispensing quantity of material. Moreover, smearing and build up of the material when it is subjected to a shearing action between two closely fitted surfaces must also be avoided.

Objects of the invention are to provide an improved dispensing device for discharging measured volumes of flowable material which is particularly useful for dispensing materials that vary in bulk density and bridge readily or that are light and fluffy and have a strong tendency towards bridging and compacting, thereby interfering with normal gravity flow, which will dispense desired weights of material within close weight tolerances, with which the measuring chamber, when dispensing light, non-compacted fluffy material, will always be filled by the act of dispensing, with which the volume or weight of the dispensed and measured material will be substantially independent of the depth of material resting on the material in the measuring chamber, which is successful in dispensing materials that have a tendency to smear and build up when sheared or rubbed between two closely fitted surfaces, or which are hygroscopic in nature.

Further objects are to provide a dispensing device for flowable materials in which such materials can be dispensed rapidly in accurately measured volumes, with a relatively simple, compact, convenient, practical, durable, trouble-free and inexpensive construction.

Various other objects and advantages will appear from the following disclosure of examples of the invention and the novel features will be particularly pointed out hereinafter in connection with the appended claims.

In the accompanying drawings:

FIGURE 2 is a side elevation partly in section of the same;

FIGURE 3 is a side elevation partly in section of the inverted dispensing device;

FIGURE 4 is a sectional elevation of the dispensing head of the same, on a larger scale, the action being taken approximately along the line 4—4 of FIGURE 3;

FIGURE 5 is a perspective of the operating handle of the device;

FIGURE 6 is a sectional elevation of a part of the inverted dispensing device, the action being taken approximately along the line 6—6 of FIGURE 4.

Figure 1:
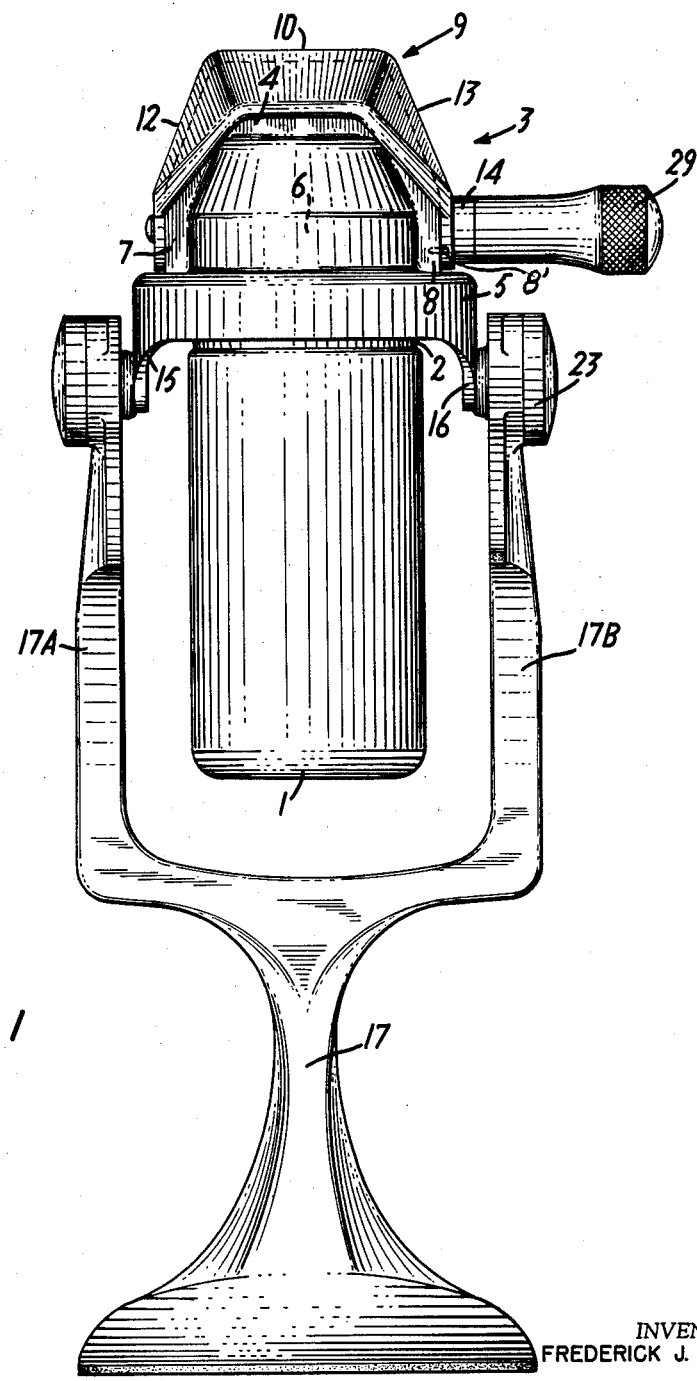
FIGURE 1 is a front elevation of a dispensing device constructed in accordance with the invention.

In the example of the invention illustrated in FIGURE 1, a dispensing device comprises a supply container 1 as for example, a jar ordinarily used to store granulated material, whose neck portion 2 (see FIGURE 4) is externally threaded and is detachably applied to dispensing head 3. The dispensing head 3 has a measuring spout 4 (see FIGURE 7) at one end, and an annular flange portion 5 which is internally threaded to engage the threads 2 of the container 1 at the other end. The measuring spout 4 is of sufficient size to store the selected amount of granulated material to be dispensed at each operation.

Located between flange 5 and the measuring spout 4 is a shaft 6 (FIGURE 4) which projects through and is rotatably supported in bearings in apertures located in the lug portions 7 and 8 of the dispensing head 3. Mounted in lug portion 8 is a pin 8' extending axially therefrom and acting as a position stop for the closure cap member 9 (see FIGURES 1 and 9B). The dispensing head 3 has on one end, a closure cap member 9 which has a closure cap 10, which is plate formed to fit across and close the operating face of a discharge port 11 (FIGURE 9A), and yoke arms 12 and 13 formed integral therewith and extending laterally toward and concentrically mounted about shaft 6. One of the yoke arms such as 13 is provided with a hub 14 that is concentric with the aperture 8 through which shaft 6 passes. Hub 14 is on the face of the yoke arm 13 opposite from aperture 7 on the dispensing head 3. The flange portion 5 has arms 15 and 16 on opposite sides thereof which are pivotally connected to the frame 17 by a diametrically aligned trunnion 18 which extends into and is rotatable in the arm 15 of the dispensing head 3. The outer end of trunnion 19 which is keyed by a square extension to arm 16, rotates in frame 17 and has a cap 23 which has a recess 24 in its face toward the frame 17. A helical spring 25 is disposed in the recess 24 and is anchored at its inner end to a pin 26 (see FIGURE 2) extending from and mounted on the arm of frame 17 into recess 24. The other end of spring 25 is anchored to a projection on the interior peripheral wall of cap 23 in recess 24. This spring is effective when free to act to aid the dispensing device to return to the upright position as shown in FIGURE 2 after it is inverted as shown in FIGURE 3.

In FIGURE 2, a side view of the dispensing device is illustrated which shows spring 25 in its unbiased condition. In this condition, closure cap member 9 is maintained fully closed about the discharge port 11. Furthermore, the operating face of the discharge port 11 is beveled in a direction such that the closure cap 10 may, by rotation of the yoke arms 12 and 13 pass rearwardly and free of the exterior operating face of the discharge port 11.

A pin projection 28 mounted on the arm 17B of frame 17 hits against the ends of the projection in the interior wall of cap 23 and acts as a position stop for the dispensing device in its upright position.

In FIGURE 3, the dispensing device is shown in its inverted position. In this position, spring 25 is fully tensioned and the outer peripheral surface of handle 29 is forced against and engages an abutment surface 30 of the arm of frame 17. This surface acts as a position stop for limiting the movement of the dispensing device in its inverted position. As can be noted, in this position, the closure cap 9 is in its fully closed position about the discharge port 11.

In FIGURE 4, the dispensing head is shown in its inverted position. In this position, the shaft 6 extends at both ends from the dispensing head 3 to provide the pivotal support for yoke arms 12 and 13. One end of the shaft 6 which pivotally mounts arm 12 loosely mounts a helical spring 31 between the arm 12 and head 3. One end 32 of the spring 31 is anchored to the dispensing head 3 and the other end 33 is anchored to arms 12 so as to urge closure cap member 9 yieldingly in a direction to move closure cap 10 in closing position across discharge port 11. The other end of shaft 6 extends beyond arm 13 and through hub 14 on the outside face of arm 13 and concentric with the shaft 6. The outer end of hub 14 has a recess 34 shown clearly in FIGURE 6 which provides two approximate radial abutments 35 and 36. The shaft 6 extends beyond the hub 14 and into a recess 37 provided in handle 29 with the end of the handle that has recess 37 abutting against and closing recess 34 in the hub 14. A pin 38 extends diametrically through handle 29 and shaft 6 so as to couple the handle through the shaft and prevent removal of handle 29 from the shaft 6 until pin 38 is drawn endwise out of coupling position. The ends of handle 29 which abuts against hub 14 has a lug 39 (see FIGS. 5 and 6) which enters recess 34 and can move to a limited extent about the axis of the shaft between the abutments 35 and 36. A spring clip 40 is also disposed in the recess 34 around the shaft 6 and in radially spaced relation to it with its free ends extending toward the outer periphery of recess 34 with one end 41 abutting against the shoulder 35 and the other end 41' of the spring clip 40 abutting against a face of lug 39 which is approximately radial to the shaft 6. The spring clip 40 is inserted in the recess 34 while its ends 41 and 41' are sprung together so that the ends of the spring clip tend to separate and yieldingly hold lug 39 against shoulder 36.

Figure 7:
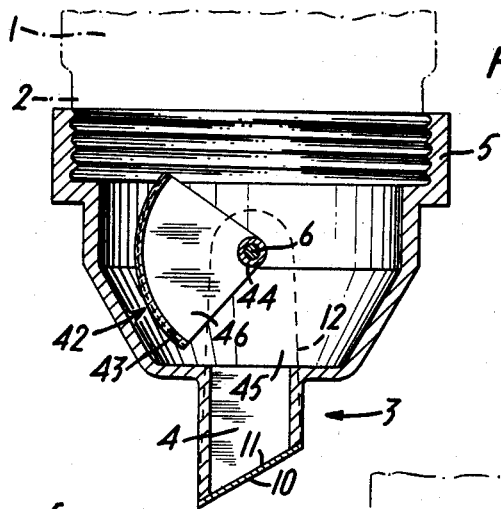
FIGURES 7–9 are schematic views of the device illustrating successive operating positions of the shutter and closure cap.
Figure 8B:
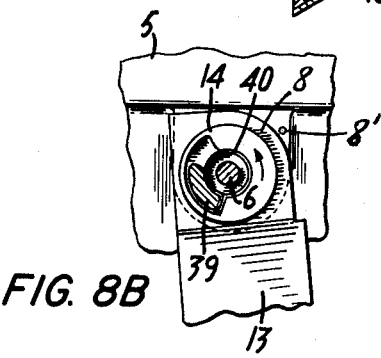
Figure 8A:
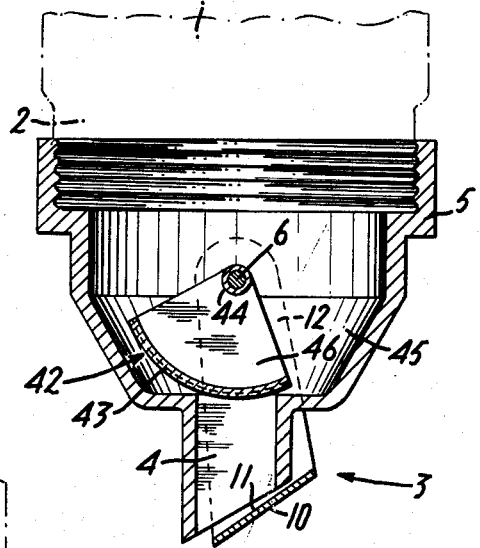
Figure 9A:
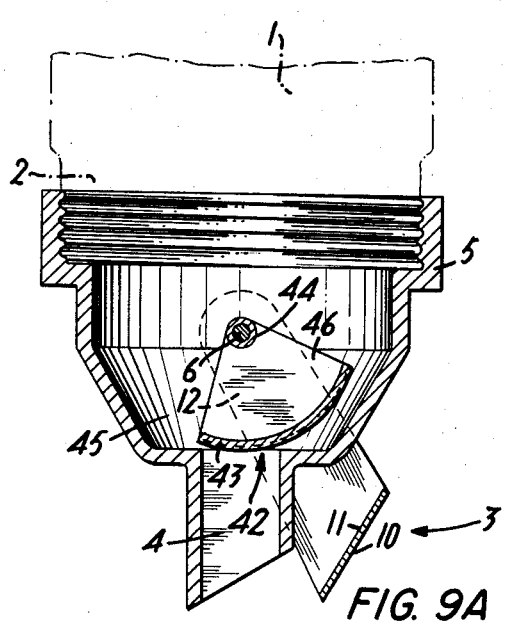
Figure 9B:
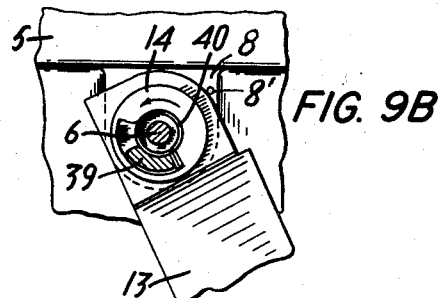

Within the chamber of dispensing head 3 is a shutter 42 (see FIGURE 7) which has a cylindrical surface 43 as its periphery serving as a gate for the shutter which is carried by a sleeve 44 that is pinned to the shaft 6 so that rotating of the shaft 6 will move the cylindrical surface 43 from an initial position at one side of entrance port 45 of measuring spout 4 successively across the entrance port 45 until it approximately closes that port as shown in FIGURE 8A which I may, for convenience, call an intermediate position and which can continue its movement into the position illustrated in FIGURE 9A where the shutter 42 still approximately closes the entrance port and which I may call the final position. Extending laterally from the sleeve 44 is a web-shaped member 46 on whose terminus is mounted shutter 42. This particular form of shutter has been shown merely for purposes of illustration. It should be noted that other configurations can be used dependent upon the inner shape of the dispensing head. The operation of the shutter 42 and the closure cap member 9 is so timed that as the closure cap 10 is in its fully closed position about discharge port 11 as illustrated in FIGURE 7, shutter 42 is in its fully opened position, and when the closure cap 10 is in its fully opened position as illustrated in FIGURE 9A, shutter 42 is in its fully closed position about entrance port 45. It should be noted that during the movement of the shutter 42 shown in FIGURE 8A to its final position shown in FIGURE 9A, the handle 29 which operates shutter 42 also picks up and operates the closure cap member 9 so as to carry cap 10 away from discharge port 11 as shown in FIGURE 9A. The means for causing the movement and pickup of closure cap 9 and its movement to uncover the discharge port 11 will now be described in FIGURES 7–9 which are schematic views of the device illustrating the successive operating positions of the shutter and the closure cap member.

Beginning first with the dispenser device in its inverted position and the closure cap member 9 and shutter 42 as shown in initial positions in FIGURES 4, 6 or 7 and the shutter 42 uncovering the entrance port 45 so that the material to be dispensed can flow downwardly by gravity to the measuring chamber of the spout 4 and fill it. Then to dispense this measured amount, the handle 29 is turned counterclockwise as shown in FIGURES 6 and 7 during which lug 39 on the end of the handle 29 will move away from the abutment 36 and force ends 40 and 41 towards each other and into contact with the other arm of that spring as shown in FIGURES 8A and 8B. During this movement, the hub 14 on the arm 13, is not moved materially since it is still urged yieldingly to keep the cap 10 closed which is opposed to the movement of the lug 39. After lug 39 has brought the ends 41 and 41' of the spring clip 40 against shoulder 35, the continued counterclockwise rotation of handle 29 will then rock arms 12 and 13 in a direction to move the closure cap member 9 in a direction away from discharge port 11. In this position, which is called the intermediate position illustrated in FIGURES 8A and 8B since the surface 43 of shutter 42 covers the entrance port 45, no other material can fall into the measuring chamber of the spout 4. Further movement of the handle 29 in the counterclockwise direction will carry a further part of the cylindrical surface across the entrance port 45 and the lug 39 will then rotate arms 12 and 13 in a direction to move cap 10 further away from the discharge port 11 so that the measured amount of material in the spout will then fall into a receiving receptacle (not shown). This is the position shown in FIGURES 9A and 9B which I have called the final position. As soon as handle 29 is released, spring clip 40 will urge lug 39 in a direction away from shoulder 35 into contact with shoulder 36 since the handle 29 with its lug 39 are fixed on the shaft 6. The closure 43 will be moved rapidly toward the intermediate positions of FIGURES 8A and 8B which releases arms 12 and 13 so that spring 31 (see FIGURE 4) can promptly return closure cap 10 to its closed position. Then further return movement of handle 29 will return the closure 43 to its initial position illustrated in FIGURE 7 and enable further materials to fall into the measuring spout 4. When swinging the dispensing device from the upright position illustrated in FIGURE 1 to the inverted position in FIGURE 3, the dispensing head engages against the abutment surface 30 on the frame 17 which limits its further movement. In that position, the handle 29 can be rotated to operate the dispensing device as described above. When the handle 29 is released entirely, the spring 31 returns the device to its upright position automatically.

It should also be noted that in FIGURE 9A, that the surface 43 of shutter 42 is slightly spaced from the edge which defines the entrance port 45. The clearance between the entrance port 45 and shutter 42 has been found necessary when a material which has a tendency to smear or build up is sheared between two closely fitted surfaces which, in this invention, would be the surfaces between the surface 43 and the edge of the entrance port 45. With such a clearance, the tendency for materials to build up or smear when sheared was greatly reduced. It is obvious that this clearance should be kept to a minimum in order to prevent leakage and as has been previously stated, the amount of clearance is solely dependent upon the texture and properties of the materials to be dispensed.

It has also been found when using a material which has a light, fluffy texture and a strong tendency towards bridging and compacting, it was found necessary to invert the dispensing device each time a measured charge of material is to be dispensed. This inverting action fills the measuring spout 4 with a light, non-compacted fluffy material by virtue of its tumbling and falling agitation. In this way, the volume or weight of the dispensed material is independent of the hydraulic head (depth of powdered fine material resting on the material in the measuring spout).

While I have described above the principles of my invention in connection with specific apparatus, it is to be clearly understood that this description is made only by way of example and not as a limitation to the scope of my invention as set forth in the objections thereof and in the accompanying claims.

I claim:

1. A dispenser for delivering measured quantities of a flowable material of the type which has a tendency to smear and build up when sheared or rubbed between closely fitting surfaces, which comprises a container with a chamber for holding a supply of said material and closed by a dispensing head that terminates in a delivery spout, said spout having an entrance port at one end thereof at its opening into said chamber and a discharge port at its opposite free end, a closure for said discharge port having arms on opposite sides of said head, a rod mounted to and passing through said head and on which said arms are pivoted for movement between one position in which it closes said discharge port and another position in which it uncovers said discharge port, means yieldingly urging said arms to swing in a direction to move said closure into its said closed position, shutter means within said head and coupled to said rod for rocking movement therewith in the same direction between three positions in succession which are a first position in which it opens said entrance port, an intermediate position in which it substantially closes said entrance port and a further position in which it continues to keep said entrance port closed, means coupled to said rod for movement therewith, to initially engage with one of said arms when said shutter reaches approximately said intermediate position to push that arm, and through it said closure into its said open position at the discharge port during continued movement of said shutter into its said further closed position across said entrance port, a frame mounting the unit formed of said container and its head for repeated movement between an upright position and an inverted position, means connecting said head to said container, and moving means for maintaining the closure in its closed position when said container is inverted.

2. A dispenser for delivering measured quantities of a flowable material of the type which has a tendency to smear and build up when sheared or rubbed between closely fitting surfaces, which comprises a container with a chamber for holding a supply of said material and closed by a dispensing head that terminates in a delivery spout, said spout having an entrance port at one end thereof at its opening into said chamber and a discharge port at its opposite free end, means mounting said container and said dispensing head unit for rocking movement between upright and inverted positions, a closure for said discharge port mounted for movement in a direction toward the face of said discharge port between one position in which it closes said discharge port, and another position in which it uncovers said discharge port, means yieldingly urging said closure into its said closed position, a shutter within said head and movable across said entrance port between three positions in succession in the same directions, in one of which positions it opens said entrance port, in another and intermediate position in which it closes said entrance port, and a further position in which it continues to close said entrance port, said shutter having a small but substantial clearance with the said entrance port sufficiently large to prevent smear and build up of said material between said shutter and said entrance port when the material is sheared by said shutter in its movement across said entrance port, means operable from the exterior of said head and coupled to said shutter for operating the shutter between its said three positions, and an interengagement between said shutter operating means and said closure for operating said closure in its open position while said shutter is between its said intermediate and said further positions, whereby repeated inversions of said container will prevent build up of said material due to absorption of moisture from the air that interferes with the ability of said material to flow freely.

References Cited in the file of this patent

UNITED STATES PATENTS

| | | |
|---|---|---|
| 1,088,096 | Rossow et al. | Feb. 24, 1914 |
| 1,215,298 | Melvin | Feb. 6, 1917 |
| 1,577,235 | Hucks | Mar. 16, 1926 |
| 1,775,912 | Packwood | Sept. 16, 1930 |
| 2,539,283 | Strachan | Jan. 23, 1951 |

FOREIGN PATENTS

| | | |
|---|---|---|
| 25,601 | Norway | Mar. 1, 1915 |